United States Patent
Hong et al.

(10) Patent No.: US 7,872,644 B2
(45) Date of Patent: Jan. 18, 2011

(54) AGING PAD AND FLAT PANEL DISPLAY DEVICE HAVING THE SAME

(75) Inventors: Soon-Kwang Hong, Daegu (KR); Young-Ju Park, Gyeongsangnam-Do (KR)

(73) Assignee: LG Display Co., Ltd., Seoul (KR)

( * ) Notice: Subject to any disclaimer, the term of this patent is extended or adjusted under 35 U.S.C. 154(b) by 804 days.

(21) Appl. No.: 11/473,137

(22) Filed: Jun. 23, 2006

(65) Prior Publication Data

US 2007/0126719 A1    Jun. 7, 2007

(30) Foreign Application Priority Data

Dec. 1, 2005    (KR) ............. 10-2005-0116529

(51) Int. Cl.
G09G 5/00    (2006.01)
G09G 3/10    (2006.01)
G09G 3/30    (2006.01)

(52) U.S. Cl. .............. 345/204; 345/76; 315/169.3

(58) Field of Classification Search .......... 345/204, 345/76; 315/169.3
See application file for complete search history.

(56) References Cited

U.S. PATENT DOCUMENTS

| | | | |
|---|---|---|---|
| 6,501,230 B1 * | 12/2002 | Feldman | 315/169.3 |
| 6,985,128 B1 * | 1/2006 | Kida et al. | 345/98 |
| 7,158,157 B2 * | 1/2007 | Yamazaki et al. | 345/691 |
| 7,209,098 B2 * | 4/2007 | Yamauchi et al. | 345/60 |
| 7,211,452 B2 * | 5/2007 | Cok et al. | 438/16 |

* cited by examiner

Primary Examiner—Amr Awad
Assistant Examiner—Johnathan Boyd
(74) Attorney, Agent, or Firm—McKenna Long & Aldridge

(57) ABSTRACT

A flat panel display device includes: a display panel; a driving circuit unit for applying a drive signal to the display panel; and a plurality of aging pads connected with the driving circuit unit and applying aging signals to the display panel, wherein each aging pad includes a plurality of sub-aging pads.

10 Claims, 2 Drawing Sheets

AGING PAD AND FLAT PANEL DISPLAY
DEVICE HAVING THE SAME

This application claims the benefit of Korean Patent Application No. 10-2005-116529, filed on Dec. 1, 2005, which is hereby incorporated by reference for all purposes as if fully set forth herein.

BACKGROUND OF THE INVENTION

1. Field of the Invention

The present invention relates to a flat panel display device having an aging pad and, more particularly, to an aging pad capable of preventing introduction of static electricity and a flat panel display device having the same.

2. Discussion of the Related Art

A flat panel display device has a screen that is a flat panel and includes a liquid crystal display (LCD), a plasma display panel (PDP), an electro luminescence, a light emitting diode arranged in a matrix, a flat CRT, etc.

The flat panel display device may be divided into a segment type device that displays a fixed pattern such as characters and numbers and a matrix type device having a plurality of pixels to display an image. In particular, the demand for the PDP and LCD, that can display color images with high resolution, is increasing.

When fabricating the PDP and the LCD, the PDP and the LCD are subjected to an aging process by applying a voltage higher than a usage voltage for typical stable and continuous driving. The aging process is performed by using aging equipment, and signals are applied to elements of a display panel through an aging pad provided on the display panel. In the case of the LCD, the aging pad is connected with gate lines and data lines of the liquid crystal display panel through a gate driver or a data driver. When fabrication of the product is completed, the aging pad may remain on the panel or be removed.

However, regarding the LCD, a thin film transistor (TFT) process, a cell process and a module process, etc., are performed to fabricate the liquid crystal display panel, and after these processes are finished, static electricity may be introduced through the aging pad that cause the drivers to fail or malfunction.

SUMMARY OF THE INVENTION

Accordingly, the present invention is directed to an aging pad and flat panel display device having the same that substantially obviates one or more of the problems due to limitations and disadvantages of the related art.

An advantage of the present invention is to provide an aging pad capable of minimizing introduction of static electricity and a flat panel display device having the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a flat panel display device including: a display panel; a driving circuit unit for applying a drive signal to the display panel; and a plurality of aging pads connected with the driving circuit unit and applying aging signals to the display panel, wherein each aging pad includes a plurality of sub-aging pads.

In another aspect of the present invention there is also provided a display panel including: a driving circuit; and a plurality of aging pads for applying aging signals to a display panel through the driving circuit and are connected with the driving circuit through an aging signal application wiring, wherein each of the aging pads includes a plurality of sub-aging pads and the sub-aging pads are arranged in a matrix.

In another aspect of the present invention there is also provided A display panel including: a driving circuit; and a plurality of aging pads for applying aging signals to a display panel through a driving circuit and are connected with the driving circuit through an aging signal application wiring, wherein each of the aging pads includes a plurality of sub-aging pads and the sub-aging pads are repeatedly arranged at certain intervals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

An aging pad and a flat panel display device having the same will be described with reference to the accompanying drawings.

Figure 1:
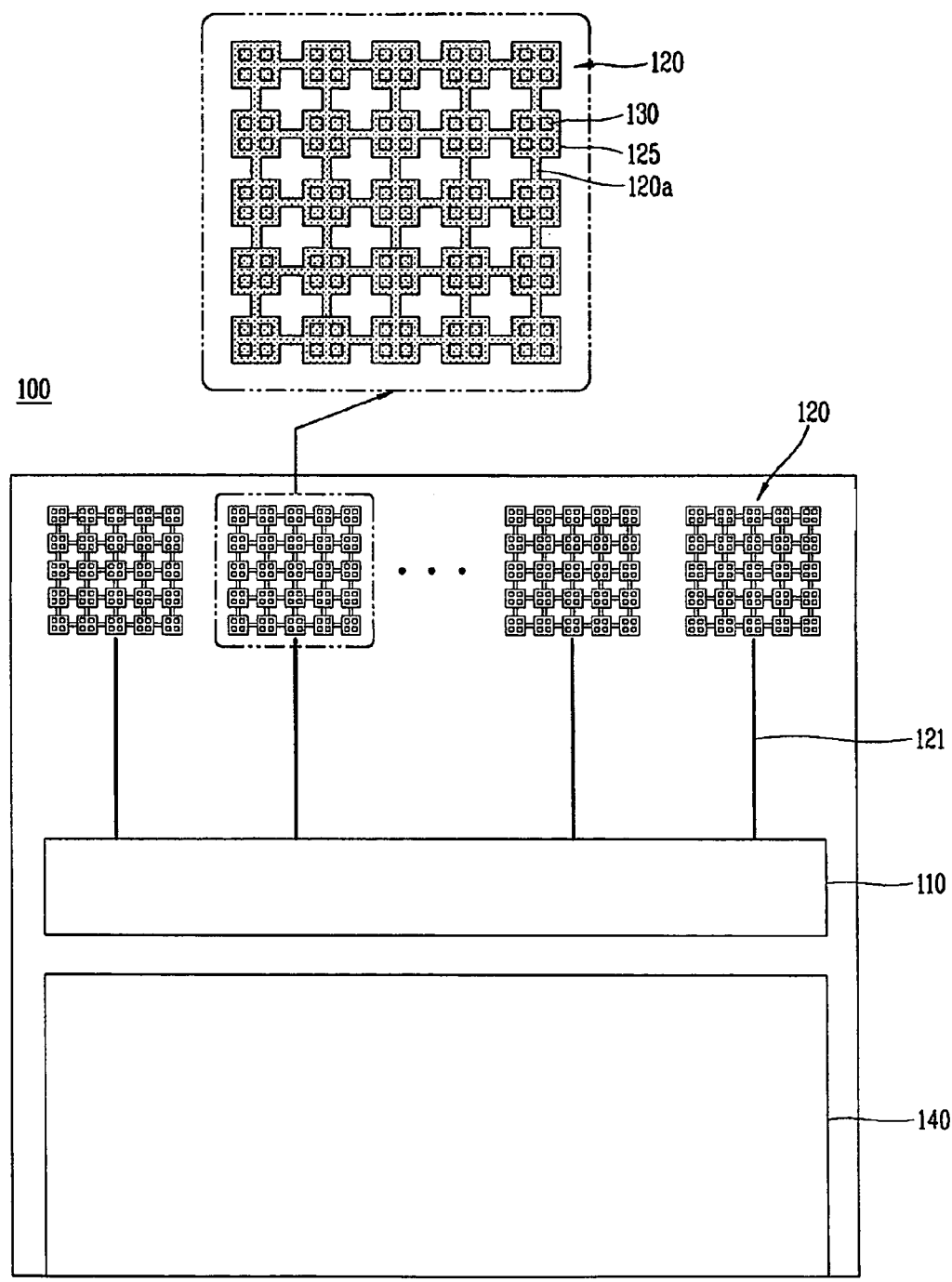
FIG. 1 is a plan view showing a flat panel display device according to the present invention.

FIG. 1 is a plan view showing a flat panel display device according to the present invention.

As shown in FIG. 1, a flat panel display device 100 includes a display panel 140 for displaying images, a driving circuit 110 for supplying a drive signal to the display panel 140, and an aging pad 120 for applying an aging signal to the display panel 140 through the driving circuit 110.

The display panel 140 may include a display panel that requires an aging process. That is, the display panel 140 may be, for example, an LCD panel, a PDP panel or an EL (Electro Luminescence) panel, and any flat panel display panel may be used.

The driving circuit 110 supplies various signals for driving the display panel 140 and includes a gate driver or a data driver.

The aging pad 120 is electrically connected with the driving circuit 110 through each aging signal application wiring 121. When an aging signal is applied to the aging pad 120, the aging signal is applied to the display panel 140 through the aging signal application wiring 121 and the driving circuit 110. At this time, the aging signal is applied through separately provided aging equipment, and especially, the aging signal is applied by making a signal application pin contact with the aging pad 120.

The aging pad 120 includes a plurality of sub-aging pads 125. The sub-aging pads 125 are repeatedly and separately disposed at certain intervals. The sub-aging pads 125 are electrically connected by a connection pattern 120a interposed therebetween. Namely, sub-aging pads 125 are repeatedly disposed at certain distance therebetween and electrically connected by the connection pattern 120a.

The reason for forming the aging pad 120 such that it is divided by the plurality of sub-aging pads 125 is to minimize the area for forming the aging pad 120 and reduce static electricity generation rate.

In detail, a region taken for the formation of the aging pad 120 is the same as in the related art, but in the present invention in the region where the aging pad 120 is formed, the area of the aging pad 120 is reduced as compared with a related art. Namely, because the aging pad 120 is divided into the plurality of sub-aging pads 125 and the sub-aging pads 125 are disposed to be separated at certain intervals, the area of the aging pad 120 may be reduced by the space between the sub-aging pads 125.

Because the sub-aging pads 125 are to be electrically connected overall, the connection pattern 120a is formed between sub-aging pads 125, and in this case, the connection pattern 120a may be designed to be formed with the minimum width provided that it can electrically connect the sub-aging pads 125. Thus, the area of the aging pad 120 can be reduced to half the area in the related art.

The sub-aging pads 125 may have a square or circular structure, but the present invention is not limited to a particular structure of the sub-aging pad 125.

Because an aging signal is to be applied through the aging equipment from outside, the aging pad 120 should be exposed. Accordingly, the aging pad 120 is connected with the aging signal application wiring 120a through a contact hole 130.

Figure 2:
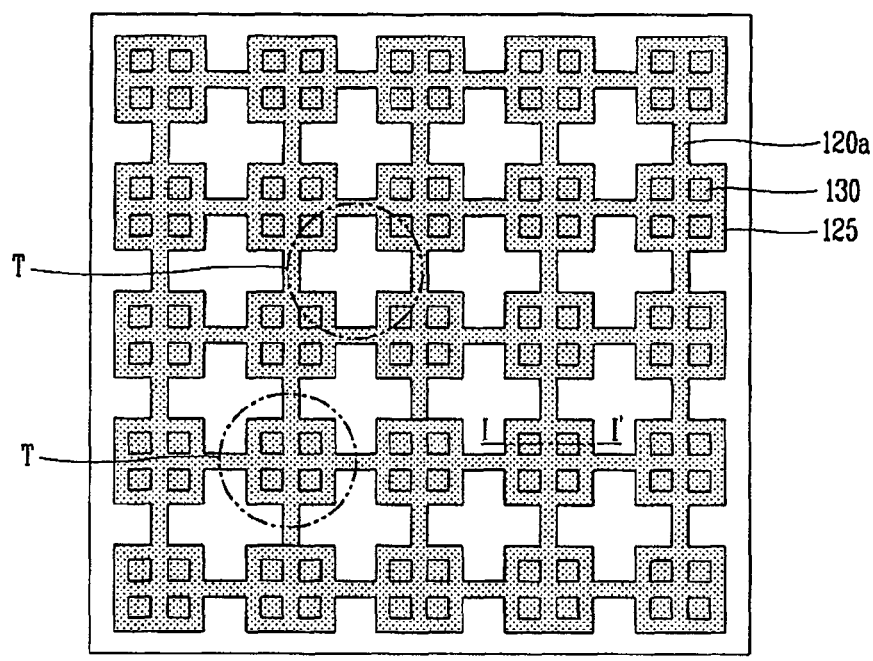
FIG. 2 is an enlarged plan view showing aging pads in FIG. 1.
Figure 3:
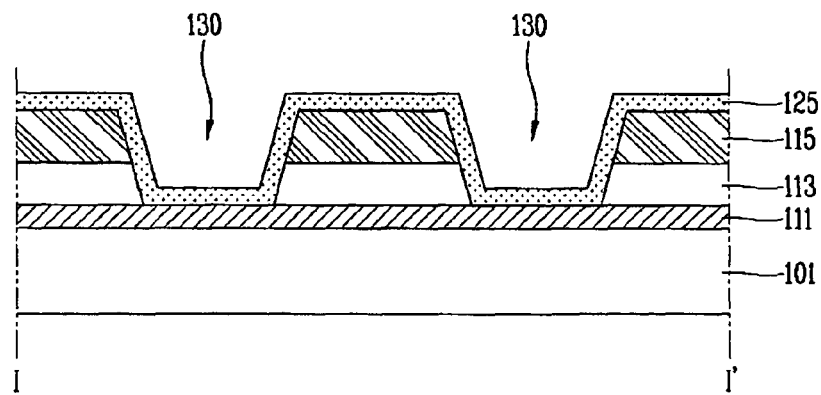
FIG. 3 is a sectional view taken along line I-I' of a sub-aging pad in FIG. 2.

FIG. 2 is an enlarged plan view showing aging pads in FIG. 1, and FIG. 3 is a sectional view taken along line I-I' of a sub-aging pad in FIG. 2, in which a section of the aging pad connected with the gate driver in the liquid crystal display panel is taken as an example.

As shown, the sub-aging pads 125 constituting the aging pad 120 are formed on the uppermost layer of a substrate 101. In this case, the sub-aging pads 125 are electrically connected with the aging signal application wiring 121 passing through a lower portion through a plurality of contact holes 130. Insulation films 113 and 115 are interposed between the sub-aging pad 125 and the aging signal application wiring 121.

The distance between the sub-aging pads 125 is to be designed such that when a signal application pin of the aging equipment contacts with the surface of the aging pad 120, the signal application pin should stably contact with the aging pad 120. Namely, as shown in FIG. 2, a sufficient area should be obtained so that no matter which region of the aging pad 120 the signal application pin of the aging equipment contacts with to apply the aging signal on the aging pad 120, the aging signal application pin can apply a signal in contact with the sub-aging pad 125.

In general, the size of the aging pad 120 can be varied according to a model of the display panel. In case of the LCD, the aging pad 120 is designed to have the width and vertical length of about 0.6 mm-0.8 mm. In this case, the diameter of the contact area (T) at which the aging signal application pin contacts with the aging pad 120 is about 200 μm-300 μm. Accordingly, the distance between the sub-aging pads 125 should be smaller than the contact area (T) with the aging signal application pin.

However, because the size of the aging pad is determined depending on a type and model of the display panel, the sub-aging pad may have a different size according to the size of the aging pad. In this respect, however, the distance between sub-aging pads should be smaller than the contact area between the aging signal application pin and the aging pad.

As so far described, in the present invention, the aging pad includes the plurality of sub-aging pads and the sub-aging pads are electrically connected to form the connection pattern, whereby the area taken by electrodes of the aging pad is substantially reduced. The present invention is not limited to a particular display panel or a particular mode of the display panel but includes every flat panel display device having an additional aging pad for performing an aging process.

By forming the plurality of sub-aging pads in a matrix at certain intervals, the area for forming a pad electrode may be reduced so that static electricity generated from the aging pad cannot be introduced into the driving circuit connected with the aging pad and thus malfunction of the driving circuit may be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A flat panel display device comprising:
    a display panel for displaying images;
    a driving circuit unit connected to the display panel for applying a drive signal to the display panel;
    a plurality of aging pads connected to the driving circuit unit for applying aging signals to the display panel through the driving circuit unit,
    wherein the aging pad is electrically connected with the driving circuit unit, each through an aging signal application wiring,
    wherein the aging pad is electrically connected with the aging signal application wiring through a plurality of contact holes;
    wherein each aging pad is divided by a plurality of sub-aging pads to minimize the area for forming the aging pad and reduce static electricity generation rate and
    wherein the sub-aging pads are repeatedly disposed at certain intervals therebetween and arranged in a matrix; and
    a connection pattern bridging the adjacent sub-aging pads for electrically connecting the plurality of sub-aging pads overall.

2. The device of claim 1, wherein the sub-aging pads have a rectangular structure.

3. The device of claim 1, wherein the sub-aging pads have a circular structure.

4. The device of claim 1, wherein an insulation film is interposed between the aging pad and the aging signal application wiring.

5. The device of claim 1, wherein the display panel is a liquid crystal display panel.

6. The device of claim 1, wherein the display panel is an electro-luminescence display panel.

7. The device of claim 1, wherein the display panel is a plasma display panel.

8. A display panel comprising:
   a driving circuit;
   a plurality of aging pads connected to the driving circuit for applying aging signals to a display panel through the driving circuit,
   wherein the aging pad is electrically connected with the driving circuit, each through an aging signal application wiring,
   wherein the aging pad is electrically connected with the aging signal application wiring through a plurality of contact holes;
   wherein each aging pad is divided by a plurality of sub-aging pads to minimize the area for forming the aging pad and reduce static electricity generation rate and
   wherein the plurality of sub-aging pads are repeatedly disposed at certain intervals therebetween and arranged in a matrix; and
   a connection pattern bridging the adjacent sub-aging pads for electrically connecting the plurality of sub-aging pads overall.

9. The display panel of claim 8, wherein the sub-aging pad has a rectangular structure.

10. The display panel of claim 8, wherein the sub-aging pad has a circular structure.

* * * * *